United States Patent
Lee et al.

(10) Patent No.: US 10,317,741 B2
(45) Date of Patent: Jun. 11, 2019

(54) TRANSFLECTIVE TYPE LIQUID CRYSTAL DISPLAY DEVICE

(71) Applicant: LG Display Co., Ltd., Seoul (KR)

(72) Inventors: Sang-Wook Lee, Paju-si (KR); Jung-Im Hwang, Goyang-si (KR); Min-Geun Choi, Paju-si (KR); Ji-Na Jeon, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/822,594

(22) Filed: Nov. 27, 2017

(65) Prior Publication Data
US 2018/0149894 A1    May 31, 2018

(30) Foreign Application Priority Data
Nov. 30, 2016 (KR) .................. 10-2016-0162199

(51) Int. Cl.
*G02F 1/1343* (2006.01)
*G02F 1/1335* (2006.01)
*G02F 1/1362* (2006.01)

(52) U.S. Cl.
CPC ...... *G02F 1/1343* (2013.01); *G02F 1/133555* (2013.01); *G02F 1/133602* (2013.01); *G02F 1/134363* (2013.01); *G02F 1/136286* (2013.01); *G02F 2001/134372* (2013.01)

(58) Field of Classification Search
CPC ............................................. G02F 1/134363

USPC .................................................. 349/141, 114
See application file for complete search history.

(56) References Cited

U.S. PATENT DOCUMENTS

| | | | |
|---|---|---|---|
| 2006/0092363 A1* | 5/2006 | Hasegawa | G02F 1/133555 349/141 |
| 2009/0262287 A1* | 10/2009 | Nishida | G02F 1/133555 349/114 |
| 2010/0060825 A1 | 3/2010 | Jang et al. | |
| 2014/0184984 A1 | 7/2014 | Kim et al. | |

FOREIGN PATENT DOCUMENTS

| | | |
|---|---|---|
| KR | 10-2008-0084196 A | 9/2008 |
| KR | 10-2010-0029633 A | 3/2010 |
| KR | 10-2014-0088471 A | 10/2014 |

* cited by examiner

*Primary Examiner* — Thanh Nhan P Nguyen
(74) *Attorney, Agent, or Firm* — Morgan, Lewis & Bockius LLP

(57) ABSTRACT

A liquid crystal display device includes: a substrate having a pixel including first and second areas; a thin film transistor on the substrate in the pixel; a first pixel electrode in the first area and connected to the thin film transistor; a first common electrode in the first area and spaced apart from the first pixel electrode by a first separation distance; a second pixel electrode in the second area and connected to the first pixel electrode; a second common electrode in the second area and spaced apart from the second pixel electrode by a second separation distance different from the first separation distance; and a liquid crystal layer on the first pixel electrode, the first common electrode, the second pixel electrode and the second common electrode.

14 Claims, 7 Drawing Sheets

TRANSFLECTIVE TYPE LIQUID CRYSTAL DISPLAY DEVICE

CROSS-REFERENCE TO RELATED APPLICATIONS

The present application claims the benefit of priority of Korean Patent Application No. 10-2016-0162199 filed in the Republic of Korea on Nov. 30, 2016, which is hereby incorporated by reference in its entirety for all purposes as if fully set forth herein.

BACKGROUND

Technical Field

The present disclosure relates to a liquid crystal display device, and more particularly to a transflective type liquid crystal display device displaying an image in a transmissive mode and a reflective mode.

Discussion of the Related Art

Recently, as the information age progresses, display devices processing and displaying a large amount of information have rapidly advanced. For example, various flat panel displays (FPDs) having a thin profile, a light weight and a low power consumption have been researched.

As a result, a thin film transistor liquid crystal display (TFT-LCD) having an excellent color reproducibility and a thin profile has been developed. The LCD device displays an image using an optical anisotropy and a polarization property of a liquid crystal molecule.

The LCD device displays an image using a light of an external light source such as a backlight unit. The light from the backlight unit is partially lost while passing through a plurality of layers of the LCD device. For example, about 7% of the light of the backlight unit may pass through the LCD device when an image is displayed.

In the LCD device displaying an image of a high brightness, since a light of a high intensity of the backlight unit is required, a power consumption increases due to the backlight unit. Further, for supplying a source power to the backlight unit of a high power consumption, a battery of a large amount and a heavy weight is required.

To solve the above problems, a reflective type LCD device using an ambient light instead of the light from the backlight unit has been suggested. Since the reflective type LCD device operates using the ambient light, the power consumption due to the backlight unit is minimized. As a result, the reflective type LCD device may operate for a relatively long time to be used as a portable display device such as an electronic notebook and a personal digital assistant (PDA).

However, since it is impossible to use the reflective type LCD device under a situation of a weak ambient light or no ambient light, a transflective type LCD device having advantages of the reflective type LCD device and the transmissive type LCD device using the backlight has been suggested.

In the transflective type LCD device using a typical liquid crystal such as a twisted nematic (TN) liquid crystal, a transmissive area and a reflective area have different cell gaps defined by a thickness of a liquid crystal layer for a uniform light efficiency between the transmissive area and the reflective area. Since a step difference is formed between the transmissive area and the reflective area for the different cell gaps, a fabrication process becomes complicated and a yield is reduced.

In an LCD device using a horizontal electric field type such as an in-plane switching (IPS) mode LCD device or a fringe field switching (FFS) mode LCD device, a liquid crystal molecule rotates according to the horizontal electric field. As a result, when retardations of the liquid crystal layer in the transmissive area and the reflective area are determined as $\lambda/2$ and $\lambda/4$, respectively, it is hard to an optical axis of the liquid crystal layer coincides with a design value. Accordingly, it is hard to apply the transflective type LCD device to the LCD device using a horizontal electric field and having an excellent viewing angle property.

To solve the above problems, a reflective type LCD device of a single cell gap including a liquid crystal capsule has been suggested.

FIG. 1 is a plan view showing a transflective type liquid crystal display device including a liquid crystal capsule according to the related art, and FIG. 2 is an equivalent circuit diagram showing a transflective type liquid crystal display device including a liquid crystal capsule according to the related art.

In FIGS. 1 and 2, a transflective type liquid crystal display (LCD) device 10 according to the related art includes a plurality of gate lines GL(2m−1), GL(2m), GL(2m+1) and GL(2m+2), a plurality of data lines DL(n−1), DL(n), DL(n+1) and DL(n+2) and a plurality of common lines CL. The plurality of gate lines GL(2m−1), GL(2m), GL(2m+1) and GL(2m+2) and the plurality of data lines DL(n−1), DL(n), DL(n+1) and DL(n+2) cross each other to define a plurality of pixels P, and the plurality of common lines CL are spaced apart from and in parallel with the plurality of gate lines GL(2m−1), GL(2m), GL(2m+1) and GL(2m+2).

Each of the plurality of pixels P includes a transmissive area TA and a reflective area RA. The transmissive area TA may be defined by odd gate lines GL(2m−1) and GL(2m+1) and the plurality of data lines DL(n−1), DL(n), DL(n+1) and DL(n+2), and the reflective area RA may be defined by even gate lines GL(2m) and GL(2m+2) and the plurality of data lines DL(n−1), DL(n), DL(n+1) and DL(n+2).

A transmissive thin film transistor (TFT) Tt is connected to the odd gate lines GL(2m−1) and GL(2m+1) and the plurality of data lines DL(n−1), DL(n), DL(n+1) and DL(n+2) corresponding to the transmissive area TA, and a reflective TFT Tr is connected to the even gate lines GL(2m) and GL(2m+2) and the plurality of data lines DL(n−1), DL(n), DL(n+1) and DL(n+2) corresponding to the reflective area RA.

A plurality of transmissive pixel electrodes 38*t* connected to the transmissive TFT Tt and a plurality of transmissive common electrodes 40*t* spaced apart from and in parallel with the plurality of transmissive pixel electrodes 38*t* are formed in the transmissive area TA.

A plurality of reflective pixel electrodes 38*r* connected to the reflective TFT Tr and a plurality of reflective common electrodes 40*r* spaced apart from and in parallel with the plurality of reflective pixel electrodes 38*r* are formed in the reflective area RA.

Here, a separation distance between the transmissive pixel electrode 38*t* and the transmissive common electrode 40*t* in the transmissive area TA may be the same as a separation distance between the reflective pixel electrode 38*r* and the reflective common electrode 40*r* in the reflective area RA.

A liquid crystal layer (not shown) having a single cell gap and including a liquid crystal capsule (not shown) is formed on the plurality of transmissive pixel electrodes 38*t*, the plurality of transmissive common electrodes 40t, the plurality of reflective pixel electrodes 38r and the plurality of reflective common electrodes 40r. Each of the transmissive pixel electrode 38t, the liquid crystal layer and the transmissive common electrode 40t in the transmissive area TA and the reflective pixel electrode 38r, the liquid crystal layer and the reflective common electrode 40r in the reflective area RA constitutes a liquid crystal capacitor Clc. The liquid crystal capacitor Clc and a storage capacitor Cst are connected to each of the transmissive TFT Tt and the reflective TFT Tt.

Here, when a high level voltage of a gate voltage transmitted through the gate line GL(2m−1), GL(2m), GL(2m+1) and GL(2m+2) is applied to the transmissive TFT Tt and the reflective TFT Tr, each of the transmissive TFT Tt and the reflective TFT Tr is turned on, and a data voltage transmitted through the data line DL(n−1), DL(n), DL(n+1) and DL(n+2) is applied to each of the transmissive pixel electrode 38t and the reflective pixel electrode 38r of the liquid crystal capacitor Clc through the transmissive TFT Tt and the reflective TFT Tr.

A light of a backlight unit (not shown) passes through the liquid crystal layer of the reflective area TA once and an ambient light passes through the liquid crystal layer of the reflective area RA twice. As a result, a uniform light efficiency is obtained when a retardation of the liquid crystal layer of the reflective area TA is greater than a retardation of the liquid crystal layer of the transmissive area RA. Accordingly, the data voltage applied to the transmissive area TA may be determined to be greater than the data voltage applied to the reflective area RA.

The transflective type LCD device 10 may display an image in a transmissive mode under a dark ambient situation by using the light of the backlight unit passing through the transmissive area TA, and the transflective type LCD device 10 may display an image in a reflective mode under a bright ambient situation by using the ambient light reflected on the reflective area RA. The transflective type LCD device 10 may display an image using the light of the backlight unit of the transmissive area TA and the ambient light of the reflective area RA according to a user's selection.

However, in the transflective type LCD device 10 including the liquid crystal capsule according to the related art, since the transmissive area TA and the reflective area RA are driven by the individual gate lines and the individual TFTs, a pixel structure becomes complicated and a transmittance of the transflective type LCD device 10 is reduced.

In addition, since the number of the gate lines increases, a driving frequency increases and a resolution is reduced.

Further, since the number of the gate lines and the number of the TFTs increase, deterioration of a fabrication process increases.

SUMMARY

Accordingly, embodiments of the present disclosure are directed to a transflective type liquid crystal display device including a liquid crystal capsule that substantially obviates one or more of the problems due to limitations and disadvantages of the related art.

Features and aspects of the inventive aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described, a liquid crystal display device comprises a substrate having a pixel including first and second areas; a thin film transistor on the substrate in the pixel; a first pixel electrode in the first area, the first pixel electrode connected to the thin film transistor; a first common electrode in the first area, the first common electrode spaced apart from the first pixel electrode by a first separation distance, the first common electrode in parallel with the first pixel electrode; a second pixel electrode in the second area, the second pixel electrode connected to the first pixel electrode; a second common electrode in the second area, the second common electrode spaced apart from the second pixel electrode by a second separation distance different from the first separation distance, the second common electrode in parallel with the second pixel electrode; and a liquid crystal layer on the first pixel electrode, the first common electrode, the second pixel electrode and the second common electrode.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated and constitute a part of this application, illustrate embodiments of the disclosure and together with the description serve to explain various principles. In the drawings.

DETAILED DESCRIPTION

Reference will now be made in detail to embodiments the present disclosure, examples of which are illustrated in the accompanying drawings.

Figure 1:
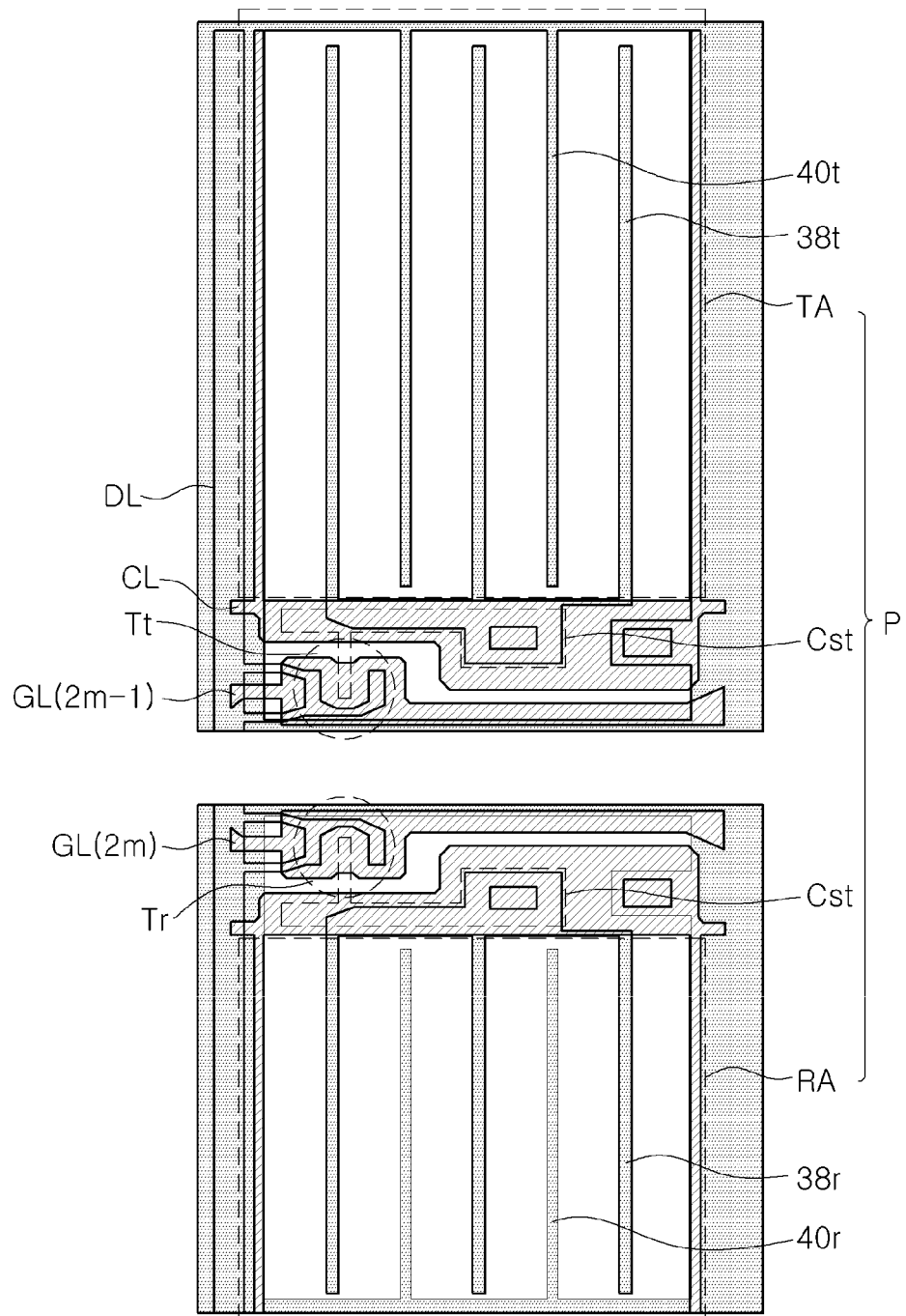
FIG. 1 is a plan view showing a transflective type liquid crystal display device including a liquid crystal capsule according to the related art.
Figure 2:
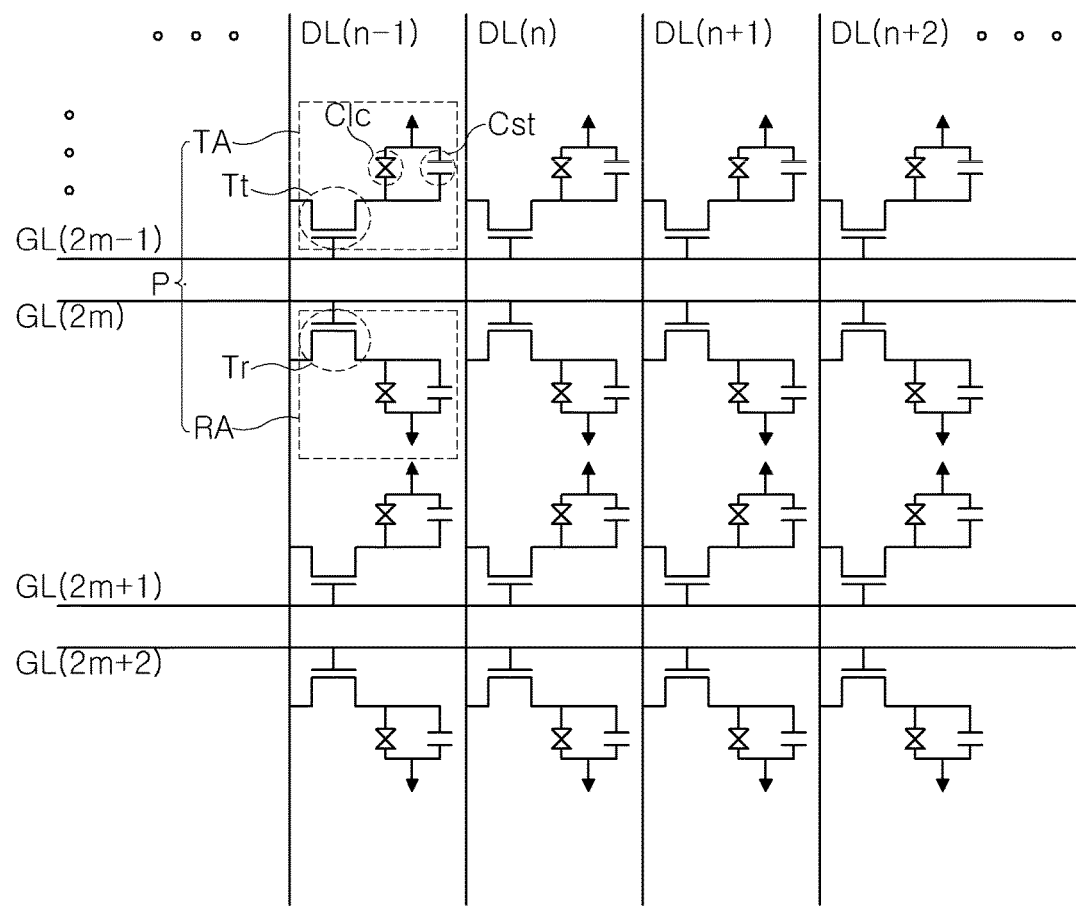
FIG. 2 is an equivalent circuit diagram showing a transflective type liquid crystal display device including a liquid crystal capsule according to the related art.
Figure 3:
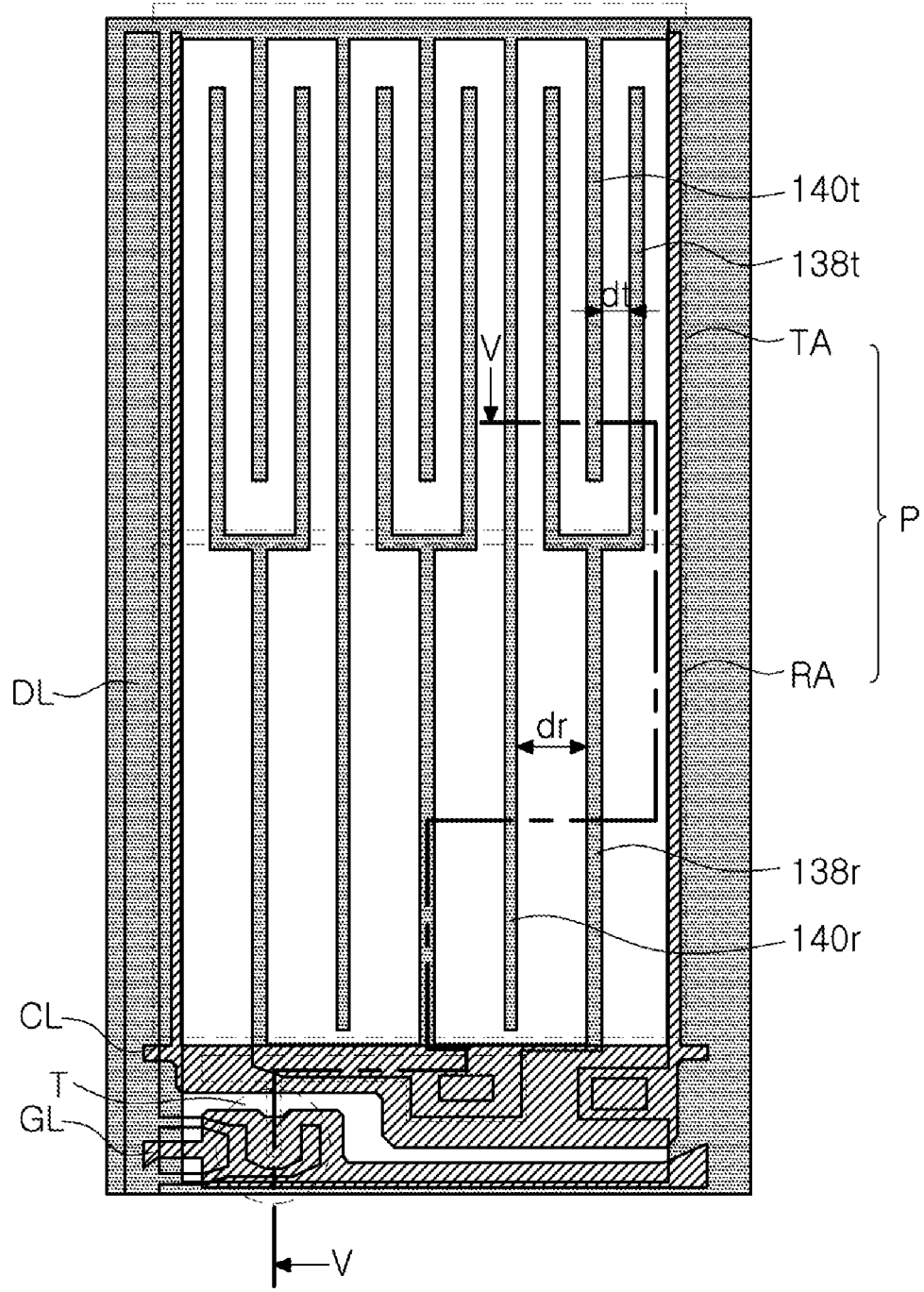
FIG. 3 is a plan view showing a transflective type liquid crystal display device including a liquid crystal capsule according to a first embodiment of the present disclosure.
Figure 4:
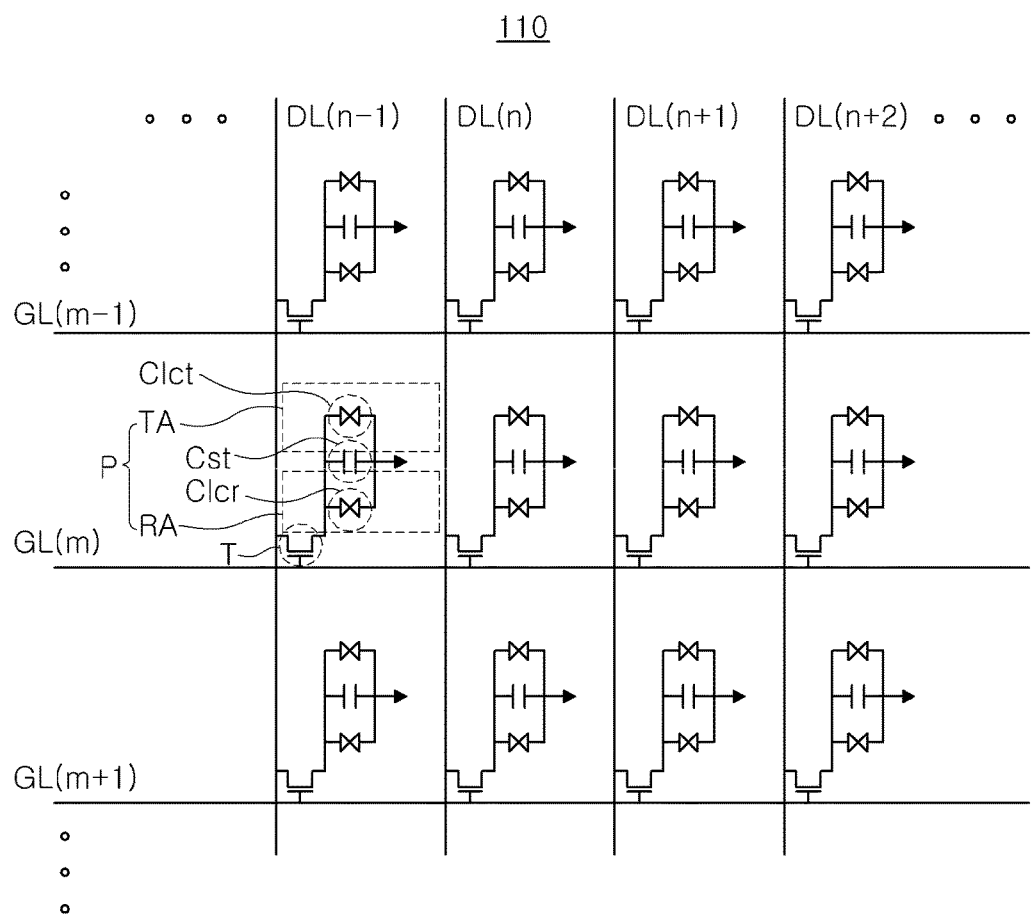
FIG. 4 is an equivalent circuit diagram showing a transflective type liquid crystal display device including a liquid crystal capsule according to a first embodiment of the present disclosure.

FIG. 3 is a plan view showing a transflective type liquid crystal display device including a liquid crystal capsule according to a first embodiment of the present disclosure, and FIG. 4 is an equivalent circuit diagram showing a transflective type liquid crystal display device including a liquid crystal capsule according to a first embodiment of the present disclosure.

In FIGS. 3 and 4, a transflective type liquid crystal display (LCD) device 110 according to a first embodiment of the present disclosure includes a plurality of gate lines GL(m−1), GL(m) and GL(m+1), a plurality of data lines DL(n−1), DL(n), DL(n+1) and DL(n+2) and a plurality of common lines CL. The plurality of gate lines GL(m−1), GL(m) and GL(m+1) and the plurality of data lines DL(n−1), DL(n), DL(n+1) and DL(n+2) cross each other to define a plurality of pixels P, and the plurality of common lines CL are spaced apart from and in parallel with the plurality of gate lines GL(m−1), GL(m) and GL(m+1). Each of the plurality of pixels P includes a transmissive area TA and a reflective area RA.

A gate electrode 122 (of FIG. 5A) of a thin film transistor (TFT) T is connected to the gate line GL(m−1), GL(m) and GL(m+1), and a source electrode 128 (of FIG. 5A) of the TFT T is connected to the data line c.

A plurality of reflective pixel electrodes 138r connected to a drain electrode 130 (of FIG. 5A) of the TFT T and a plurality of reflective common electrodes 140r spaced apart from and in parallel with the plurality of reflective pixel electrodes 138r are formed in the reflective area RA.

A plurality of transmissive pixel electrodes 138t connected to the plurality of reflective pixel electrodes 138r of the reflective area RA and a plurality of transmissive common electrodes 140t spaced apart from and in parallel with the plurality of transmissive pixel electrodes 138t are formed in the transmissive area TA. The plurality of transmissive common electrodes 140t are connected to the plurality of reflective common electrodes 140r of the reflective area RA.

Here, the plurality of reflective pixel electrodes 138r, the plurality of reflective common electrodes 140r, the plurality of transmissive pixel electrodes 138t and the plurality of transmissive common electrodes 140t may have a bar shape and may be disposed along a first direction in parallel with the plurality of data lines DL(n−1), DL(n), DL(n+1) and DL(n+2).

In another embodiment, the plurality of reflective pixel electrodes 138r, the plurality of reflective common electrodes 140r, the plurality of transmissive pixel electrodes 138t and the plurality of transmissive common electrodes 140t may be disposed along a second direction in parallel with the plurality of gate lines GL(m−1), GL(m) and GL(m+1). Ones of the plurality of reflective pixel electrodes 138r and the plurality of reflective common electrodes 140r may have a plate shape and the others of the plurality of reflective pixel electrodes 138r and the plurality of reflective common electrodes 140r may have a bar shape. Alternatively, ones of the plurality of transmissive pixel electrodes 138t and the plurality of transmissive common electrodes 140t may have a plate shape and the others of the plurality of transmissive pixel electrodes 138t and the plurality of transmissive common electrodes 140t may have a bar shape.

A reflective separation distance dr between the reflective pixel electrode 138r and the reflective common electrode 140r in the reflective area RA may be greater than a transmissive separation distance between the transmissive pixel electrode 138t and the transmissive common electrode 140t in the transmissive area TA. (dr>dt)

For example, the reflective separation distance dr may be substantially twice of the transmissive separation distance dt (dr~2dt)(e.g., 1.8dt≤dr≤2.2dt), and the reflective separation distance dr and the transmissive separation distance dt may be about 13.4 μm and about 5.7 μm, respectively.

A liquid crystal layer 142 (of FIG. 5A) having a single cell gap and including a liquid crystal capsule 144 (of FIG. 5A) is formed on the plurality of reflective pixel electrodes 138r, the plurality of reflective common electrodes 140r, the plurality of transmissive pixel electrodes 138t and the plurality of transmissive common electrodes 140t. The reflective pixel electrode 138r, the liquid crystal layer 142 and the reflective common electrode 140r in the reflective area RA constitutes a reflective liquid crystal capacitor Clcr, and the transmissive pixel electrode 138t, the liquid crystal layer 142 and the transmissive common electrode 140t in the transmissive area TA constitutes a transmissive liquid crystal capacitor Clct. The reflective liquid crystal capacitor Clcr, the transmissive liquid crystal capacitor Clct and a storage capacitor Cst are connected to the TFT T.

Here, when a high level voltage of a gate voltage transmitted through the gate line GL(m−1), GL(m) and GL(m+1) is applied to the TFT T, the TFT T is turned on, and a data voltage transmitted through the data line DL(n−1), DL(n), DL(n+1) and DL(n+2) is applied to each of the reflective pixel electrode 138r of the reflective liquid crystal capacitor Clcr and the transmissive pixel electrode 138t of the transmissive liquid crystal capacitor Clct through the TFT T.

The data voltage is applied to one electrode of the storage capacitor Cst, and the storage capacitor Cst keeps a voltage of the the reflective pixel electrode 138r of the reflective liquid crystal capacitor Clcr and the transmissive pixel electrode 138t of the transmissive liquid crystal capacitor Clct constant for one frame.

In the transflective type LCD device 110, a light of a backlight unit (not shown) passes through the liquid crystal layer 142 of the transmissive area TA once and an ambient light passes through the liquid crystal layer 142 of the reflective area RA twice. In addition, the reflective separation distance dr between the reflective pixel electrode 138r and the reflective common electrode 140r in the reflective area RA is greater than the transmissive separation distance dt between the transmissive pixel electrode 138t and the transmissive common electrode 140t in the transmissive area TA. As a result, a retardation of the liquid crystal layer 142 of the transmissive area TA is greater than a retardation of the liquid crystal layer 142 of the reflective area RA, and a uniform light efficiency is obtained in the reflective area RA and the transmissive area TA.

Since the transmissive separation distance dt between the transmissive pixel electrode 138t and the transmissive common electrode 140t in the transmissive area TA is smaller than the reflective separation distance dr between the reflective pixel electrode 138r and the reflective common electrode 140r in the reflective area RA, an intensity of an electric field of the transmissive area TA generated between the transmissive pixel electrode 138t and the transmissive common electrode 140t may be greater than an intensity of an electric field of the reflective area RA generated between the reflective pixel electrode 138r and the reflective common electrode 140r even when the same data voltage is applied to the reflective pixel electrode 138r and the transmissive pixel electrode 138t. As a result, a liquid crystal molecule 148 (of FIG. 5A) in the liquid crystal capsule 144 of the liquid crystal layer 142 of the transmissive area TA is aligned along a direction of the electric field more uniformly than a liquid crystal molecule 148 in the liquid crystal capsule 144 of the liquid crystal layer 142 of the reflective area RA, and an average retardation of the liquid crystal layer 142 of the transmissive area TA may be greater than an average retardation of the liquid crystal layer 142 of the reflective area RA.

For example, the liquid crystal layer 142 of the transmissive area TA may have an average retardation of λ/2 and the liquid crystal layer 142 of the reflective area RA may have an average retardation of λ/4 by the same data voltage. The average retardations of λ/2 and λ/4 may have a fabrication deviation of about ±20 nm.

The transflective type LCD device 110 may display an image in a transmissive mode under a dark ambient situation by using the light of the backlight unit passing through the transmissive area TA, and the transflective type LCD device 110 may display an image in a reflective mode under a bright ambient situation by using the ambient light reflected on the reflective area RA. The transflective type LCD device 110 may display an image in a transflective mode by using both of the light of the backlight unit of the transmissive area TA and the ambient light of the reflective area RA according to a user's selection.

Figure 5A:
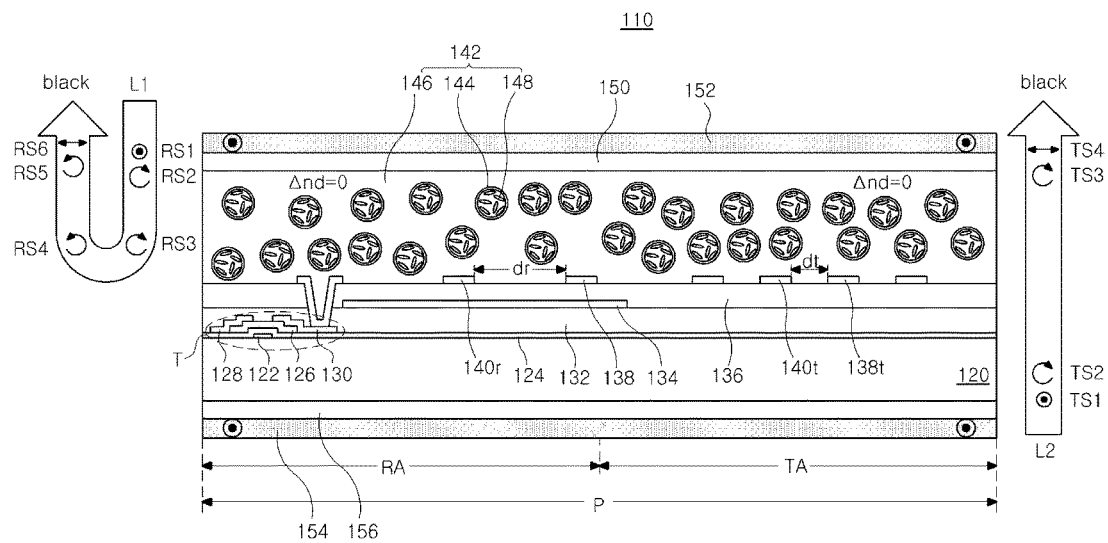
FIGS. 5A and 5B are cross-sectional views taken along a line V-V of FIG. 3.
Figure 5B:
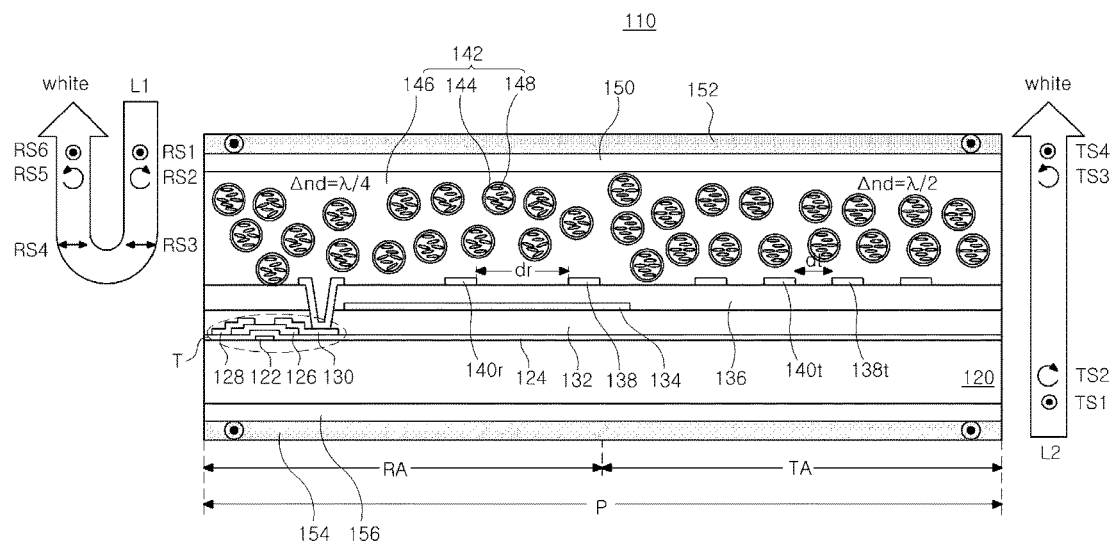

FIGS. 5A and 5B are cross-sectional views taken along a line V-V of FIG. 3. A polarization state of a light when the transflective LCD device 110 displays a black and a white is shown in FIGS. 5A and 5B.

In FIGS. 5A and 5B, a transflective type liquid crystal display (LCD) device 110 according to a first embodiment of the present disclosure includes a substrate 120 including a pixel P having a reflective area RA and a transmissive area TA, a liquid crystal layer 142 on the substrate 120 and a backlight unit (not shown) under the substrate 120.

A thin film transistor (TFT) T including a gate electrode 122, a semiconductor layer 126, a source electrode 128 and a drain electrode 130 is formed on the substrate 120 in each pixel P, and an interlayer insulating layer 132 is formed on the TFT T over an entire surface of the substrate 120. A reflecting layer 134 is formed on the interlayer insulating layer 132 in the reflective area RA.

A passivation layer 136 is formed on the reflecting layer 134 over an entire surface of the substrate 120. A plurality of reflective pixel electrodes 138r and a plurality of reflective common electrodes 140r are formed on the passivation layer 136 in the reflective area RA, and a plurality of transmissive pixel electrodes 138t and a plurality of transmissive common electrodes 140t are formed on the passivation layer 136 in the transmissive area TA.

In the reflective area RA, the plurality of reflective pixel electrodes 138r are connected to a drain electrode of the TFT T, and the plurality of reflective common electrodes 140r are spaced apart from and in parallel with the plurality of reflective pixel electrodes 138r. The plurality of reflective pixel electrodes 138r and the plurality of reflective common electrodes 140r may be disposed alternately with each other.

In the transmissive area TA, the plurality of transmissive pixel electrodes 138t are connected to the plurality of reflective pixel electrodes 138r, and the plurality of transmissive common electrodes 140t are connected to the plurality of reflective common electrodes 140r and spaced apart from and in parallel with the plurality of transmissive pixel electrodes 138t. The plurality of transmissive pixel electrodes 138t and the plurality of transmissive common electrodes 140t may be disposed alternately with each other.

A reflective separation distance between the reflective pixel electrode 138r and the reflective common electrode 140r may be greater than a transmissive separation distance dt between the transmissive pixel electrode 138t and the transmissive common electrode 140t (dr>dt). For example, the reflective separation distance dr may be substantially twice of the transmissive separation distance dt (dr~2dt) (e.g., 1.8dt≤dr≤2.2dt).

A liquid crystal layer 142 having a single cell gap is formed on the plurality of reflective pixel electrodes 138r, the plurality of reflective common electrodes 140r, the plurality of transmissive pixel electrodes 138t and the plurality of transmissive common electrodes 140t. The liquid crystal layer 142 includes a plurality of liquid crystal capsules 144 and a binder 146 where the plurality of liquid crystal capsules 144 are dispersed, and each of the plurality of liquid crystal capsules 144 includes a plurality of liquid crystal molecules 148.

Here, the liquid crystal layer 142 may have a thickness within a range of about 2.5 μm to about 3.5 μm.

Each of the plurality of liquid crystal capsules 144 may be a polymer capsule having a diameter of about 1 nm to about 999 nm (e.g., a diameter smaller than a wavelength of a visible ray). For example, each liquid crystal capsule 144 may include a water soluble material such as poly vinyl alcohol (PVA) or a fat soluble material such as poly methyl methacrylate (PMMA). Each liquid crystal capsule 144 may have a diameter within a range of about 1 nm to about 320 nm.

The binder 146 may be transparent or opaque, and the binder may have a water solubility, a fat solubility or a mixed property of a water solubility and a fat solubility.

The plurality of liquid crystal molecules 148 may include at least one of a nematic liquid crystal molecule, a ferro-electric liquid crystal molecule and a flexo electric liquid crystal molecule.

A thickness (i.e., a cell gap) of the liquid crystal layer 142 of the reflective area RA and a thickness (i.e., a cell gap) of the liquid crystal layer 142 of the transmissive area TA are the same as each other, and the liquid crystal layer 142 may have a single cell gap in a whole of the transflective type LCD device 110.

A first retardation film 150 is formed on the liquid crystal layer 142, and a first polarizing film 152 is formed on the first retardation film 150. In addition, a second retardation film 156 is formed under the substrate 120, and a second polarizing film 154 is formed under the second retardation film 156.

Each of the first and second retardation films 150 and 156 may be a quarter wave plate (QWP) having a retardation of λ/4, and each of the first and second polarizing films 152 and 154 may be a linear polarizing plate having a transmission axis perpendicular to the plane of the paper.

Here, the liquid crystal layer 142 including the plurality of liquid crystal capsules 144 may be fabricated as a film through a soluble process to be attached to the substrate using an adhesive layer or an adhesive material.

Since the liquid crystal layer 142 including the plurality of liquid crystal capsules 144 is formed without an alignment layer, the liquid crystal layer 142 including the plurality of liquid crystal capsules 144 may directly contact the passivation layer 136 and the first retardation film 150.

In the transflective type LCD device 110, a data voltage of the data line DL(n−1), DL(n), DL(n+1) and DL(n+2) is applied to the plurality of reflective pixel electrodes 138r and the plurality of transmissive pixel electrodes 138t through the TFT T turned on according to a high level voltage of a gate voltage of the gate line GL(m−1), GL(m) and GL(m+1). In addition, the liquid crystal molecule 148 of the liquid crystal capsule 144 is re-aligned due to a first horizontal electric field generated between the plurality of reflective pixel electrodes 138r and the plurality of reflective common electrodes 140r and a second electric field generated between the plurality of transmissive pixel electrodes 138*t* and the plurality of transmissive common electrodes 140*t*.

Since the transmissive separation distance dt of the transmissive area TA is smaller than the reflective separation distance dr of the reflective area RA, an intensity of the second electric field of the transmissive area TA may be greater than an intensity of the first electric field of the reflective area RA. As a result, the liquid crystal molecule 148 in the liquid crystal capsule 144 of the liquid crystal layer 142 of the transmissive area TA is aligned along a direction of the electric field more uniformly than the liquid crystal molecule 148 in the liquid crystal capsule 144 of the liquid crystal layer 142 of the reflective area RA, and an average retardation of the liquid crystal layer 142 of the transmissive area TA may be greater than an average retardation of the liquid crystal layer 142 of the reflective area RA.

The transflective type LCD device 110 may be driven in a reflective mode, a transmissive mode or a transflective mode. In the reflective mode, after a first light L1 incident to a front surface of the substrate 120 from an exterior passes through the liquid crystal layer 142 of the reflective area RA, the first light L1 is reflected by the reflective layer 134 and the first light L1 passes through the liquid crystal layer 142 of the reflective area RA again to display a gray level. In the transmissive mode, a second light L2 incident to a rear surface of the substrate 120 from the backlight unit passes through the liquid crystal layer 142 of the transmissive area TA to display a gray level.

In FIG. 5A, when the reflective area RA of the transflective type LCD device 110 displays a black, a first voltage V1 is applied between the reflective pixel electrode 138*r* and the reflective common electrode 140*r*, and the liquid crystal molecule 148 in the liquid crystal capsule 144 is randomly aligned. The liquid crystal layer 142 of the reflective area RA has an average retardation ($\Delta$nd) of 0. For example, the first voltage V1 may be 0V.

The first light L1 of the exterior is incident to the reflective area RA. The first light L1 having passed through the first polarizing film 152 has a first reflective state RS1 of a first linear polarization having a polarization direction perpendicular to the plane of the paper, and the first light L1 having passed through the first retardation film 150 has a second reflective state RS2 of a left-handed circular polarization. The first light L1 having passed through the liquid crystal layer 142 of the reflective area RA having the average retardation ($\Delta$nd) of 0 has a third reflective state RS3 of a left-handed circular polarization the same as the second reflective state RS2, and the first light L1 having been reflected by the reflecting layer 134 has a fourth reflective state RS4 of a right-handed circular polarization. The first light L1 having passed through the liquid crystal layer 142 of the reflective area RA having the average retardation ($\Delta$nd) of 0 again has a fifth reflective state RS5 of a right-handed circular polarization the same as the fourth reflective state SR4, and the first light L1 having passed through the first retardation film 150 has a sixth reflective state SR6 of a second linear polarization having a polarization direction parallel to the plane of the paper. As a result, a whole of the first light L1 having passed through the first retardation film 150 is absorbed by the first polarizing film 152 having a transmission axis perpendicular to the plane of the paper, and the reflective area RA may display a black.

In addition, when the transmissive area TA of the transflective type LCD device 110 displays a black, the first voltage V1 is applied between the transmissive pixel electrode 138*t* and the transmissive common electrode 140*t*, and the liquid crystal molecule 148 in the liquid crystal capsule 144 is randomly aligned. The liquid crystal layer 142 of the transmissive area TA has an average retardation ($\Delta$nd) of 0. For example, the first voltage V1 may be 0V.

The second light L2 of the backlight unit is incident to the transmissive area TA. The second light L2 having passed through the second polarizing film 154 has a first transmissive state TS1 of the first linear polarization having a polarization direction perpendicular to the plane of the paper, and the second light L2 having passed through the second retardation film 156 has a second transmissive state TS2 of the left-handed circular polarization. The second light L2 having passed through the liquid crystal layer 142 of the transmissive area TA having the average retardation ($\Delta$nd) of 0 has a third transmissive state TS3 of the left-handed circular polarization, and the second light L2 having passed through the first retardation film 150 has a fourth transmissive state TS4 of the second linear polarization having a polarization direction parallel to the plane of the paper. As a result, a whole of the second light L2 having passed through the first retardation film 150 is absorbed by the first polarizing film 152 having a transmission axis perpendicular to the plane of the paper, and the transmissive area TA may display a black.

In FIG. 5B, when the reflective area RA of the transflective type LCD device 110 displays a white, a second voltage V2 is applied between the reflective pixel electrode 138*r* and the reflective common electrode 140*r*, and the liquid crystal molecule 148 in the liquid crystal capsule 144 is re-aligned by the first horizontal electric field generated between the reflective pixel electrode 138*r* and the reflective common electrode 140*r*. The liquid crystal layer 142 of the reflective area RA has an average retardation ($\Delta$nd) of $\lambda/4$. For example, the second voltage V2 may be greater than the first voltage V1.

The first light L1 of the exterior is incident to the reflective area RA. The first light L1 having passed through the first polarizing film 152 has a first reflective state RS1 of a first linear polarization having a polarization direction perpendicular to the plane of the paper, and the first light L1 having passed through the first retardation film 150 has a second reflective state RS2 of a left-handed circular polarization. The first light L1 having passed through the liquid crystal layer 142 of the reflective area RA having the average retardation ($\Delta$nd) of $\lambda/4$ has a third reflective state RS3 of a second linear polarization having a polarization direction parallel to the plane of the paper, and the first light L1 having been reflected by the reflecting layer 134 has a fourth reflective state RS4 of the second linear polarization having a polarization direction parallel to the plane of the paper. The first light L1 having passed through the liquid crystal layer 142 of the reflective area RA having the average retardation ($\Delta$nd) of $\lambda/4$ again has a fifth reflective state RS5 of a right-handed circular polarization, and the first light L1 having passed through the first retardation film 150 has a sixth reflective state SR6 of the first linear polarization having a polarization direction perpendicular to the plane of the paper. As a result, a whole of the first light L1 having passed through the first retardation film 150 passes through the first polarizing film 152 having a transmission axis perpendicular to the plane of the paper, and the reflective area RA may display a white.

In addition, when the transmissive area TA of the transflective type LCD device 110 displays a white, the second voltage V2 is applied between the transmissive pixel electrode 138*t* and the transmissive common electrode 140*t*, and the liquid crystal molecule 148 in the liquid crystal capsule 144 is re-aligned by the second horizontal electric field generated between the transmissive pixel electrode 138t and the transmissive common electrode 140t. The liquid crystal layer 142 of the transmissive area TA has an average retardation (Δnd) of λ/2. For example, the second voltage V2 may be greater than the first voltage V1.

The second light L2 of the backlight unit is incident to the transmissive area TA. The second light L2 having passed through the second polarizing film 154 has a first transmissive state TS1 of the first linear polarization having a polarization direction perpendicular to the plane of the paper, and the second light L2 having passed through the second retardation film 156 has a second transmissive state TS2 of the left-handed circular polarization. The second light L2 having passed through the liquid crystal layer 142 of the transmissive area TA having the average retardation (Δnd) of λ/2 has a third transmissive state TS3 of the right-handed circular polarization, and the second light L2 having passed through the first retardation film 150 has a fourth transmissive state TS4 of the first linear polarization having a polarization direction parallel to the plane of the paper. As a result, a whole of the second light L2 having passed through the first retardation film 150 passes through the first polarizing film 152 having a transmission axis perpendicular to the plane of the paper, and the transmissive area TA may display a white.

In the transflective type LCD device 110 including the liquid crystal capsule according to the first embodiment of the present disclosure, since the transmissive separation distance dt between the transmissive pixel electrode 138t and the transmissive common electrode 140t in the transmissive area TA of the pixel P is smaller than the reflective separation distance dr between the reflective pixel electrode 138r and the reflective common electrode 140r in the reflective area RA of the pixel P, the liquid crystal layer 142 of the transmissive area TA and the liquid crystal layer 142 of the reflective area RA have the different average retardations even by the single data voltage.

Since the liquid crystal layer 142 of the transmissive area TA and the liquid crystal layer 142 of the reflective area RA have the average retardations of λ/4 and λ/2, respectively, by the single data voltage, the transmissive area TA and the reflective area RA are driven by the single gate line and the single data voltage. Accordingly, the number of the gate lines and the number of the TFTs are reduced and the fabrication process is simplified. In addition, the transmittance increases, and increase of the driving frequency and decrease of the resolution are prevented.

Further, since the liquid crystal layer 142 has the single cell gap using the plurality of liquid crystal capsules 144 and the liquid crystal layer 142 of the reflective area RA and the transmissive area TA has different retardations due to the first and second horizontal electric fields, a black is displayed without a light leakage and the fabrication process is simplified. In addition, a contrast ratio is improved and a power consumption is reduced.

Moreover, a brightness of a black is further reduced and a contrast ratio is further improved by displaying a gray level using the first and second retardation films 150 and 156.

In another embodiment, a viewing angel may be improved by a transmissive pixel electrode and a transmissive common electrode of a transmissive area and a reflective pixel electrode and a reflective common electrode of a reflective area having different arrangement directions.

Figure 6:
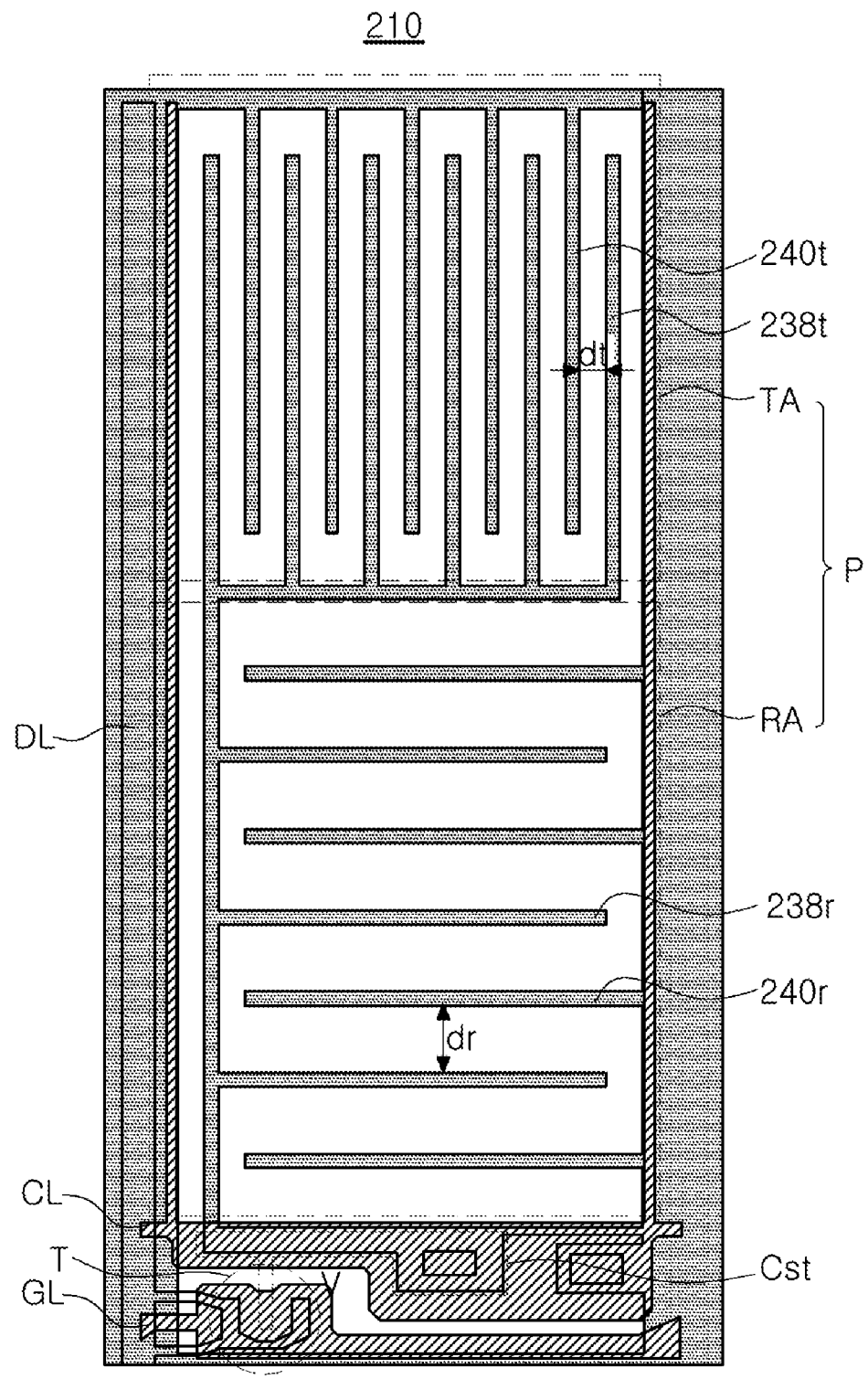
FIG. 6 is a plan view showing a transflective type liquid crystal display device including a liquid crystal capsule according to a second embodiment of the present disclosure.

FIG. 6 is a plan view showing a transflective type liquid crystal display device including a liquid crystal capsule according to a second embodiment of the present disclosure. Illustrations on parts of the second embodiment which are the same as parts of the first embodiment will be omitted.

In FIG. 6, a transflective type liquid crystal display (LCD) device 210 according to a second embodiment of the present disclosure includes a plurality of gate lines GL, a plurality of data lines DL and a plurality of common lines CL. The plurality of gate lines GL and the plurality of data lines DL cross each other to define a plurality of pixels P, and the plurality of common lines CL are spaced apart from and in parallel with the plurality of gate lines GL. Each of the plurality of pixels P includes a transmissive area TA and a reflective area RA.

A gate electrode of a thin film transistor (TFT) T is connected to the gate line GL, and a source electrode of the TFT T is connected to the data line DL.

A plurality of reflective pixel electrodes 238r connected to a drain electrode of the TFT T and a plurality of reflective common electrodes 240r spaced apart from and in parallel with the plurality of reflective pixel electrodes 238r are formed in the reflective area RA.

A plurality of transmissive pixel electrodes 238t connected to the plurality of reflective pixel electrodes 238r of the reflective area RA and a plurality of transmissive common electrodes 240t connected to the plurality of reflective common electrodes 240r of the reflective area RA and spaced apart from and in parallel with the plurality of transmissive pixel electrodes 238t are formed in the transmissive area TA.

Here, the plurality of reflective pixel electrodes 238r, the plurality of reflective common electrodes 240r, the plurality of transmissive pixel electrodes 238t and the plurality of transmissive common electrodes 240t may have a bar shape. The plurality of reflective pixel electrodes 238r and the plurality of reflective common electrodes 240r may be disposed along a first direction in parallel with the plurality of data lines DL, and the plurality of transmissive pixel electrodes 238t and the plurality of transmissive common electrodes 240t may be disposed along a second direction in parallel with the plurality of gate lines GL.

In another embodiment, the plurality of reflective pixel electrodes 238r and the plurality of reflective common electrodes 240r may be disposed along the second direction in parallel with the plurality of gate lines GL, and the plurality of transmissive pixel electrodes 238t and the plurality of transmissive common electrodes 240t may be disposed along the first direction in parallel with the plurality of data lines DL. Ones of the plurality of reflective pixel electrodes 238r and the plurality of reflective common electrodes 240r may have a plate shape and the others of the plurality of reflective pixel electrodes 238r and the plurality of reflective common electrodes 240r may have a bar shape. Alternatively, ones of the plurality of transmissive pixel electrodes 238t and the plurality of transmissive common electrodes 240t may have a plate shape and the others of the plurality of transmissive pixel electrodes 238t and the plurality of transmissive common electrodes 240t may have a bar shape.

A reflective separation distance dr between the reflective pixel electrode 238r and the reflective common electrode 240r in the reflective area RA may be greater than a transmissive separation distance dt between the transmissive pixel electrode 238t and the transmissive common electrode 240t in the transmissive area TA. (dr>dt)

For example, the reflective separation distance dr may be substantially twice of the transmissive separation distance dt (dr~2dt)(e.g., $1.8dt \leq dr \leq 2.2dt$), and the reflective separation distance dr and the transmissive separation distance dt may be about 13.4 µm and about 5.7 µm, respectively.

A liquid crystal layer (not shown) having a single cell gap and including a liquid crystal capsule (not shown) is formed on the plurality of reflective pixel electrodes 238r, the plurality of reflective common electrodes 240r, the plurality of transmissive pixel electrodes 238t and the plurality of transmissive common electrodes 240t.

Here, when a high level voltage of a gate voltage transmitted through the gate line GL is applied to the TFT T, the TFT T is turned on, and a data voltage transmitted through the data line DL is applied to each of the reflective pixel electrode 238r and the transmissive pixel electrode 238t through the TFT T.

In the transflective type LCD device 210, a light of a backlight unit (not shown) passes through the liquid crystal layer of the transmissive area TA once and an ambient light passes through the liquid crystal layer of the reflective area RA twice. In addition, the reflective separation distance dr between the reflective pixel electrode 238r and the reflective common electrode 240r in the reflective area RA is greater than the transmissive separation distance dt between the transmissive pixel electrode 238t and the transmissive common electrode 240t in the transmissive area TA. As a result, a retardation of the liquid crystal layer of the transmissive area TA is greater than a retardation of the liquid crystal layer of the reflective area RA, and a uniform light efficiency is obtained in the reflective area RA and the transmissive area TA.

Since the transmissive separation distance dt between the transmissive pixel electrode 238t and the transmissive common electrode 240t in the transmissive area TA is smaller than the reflective separation distance dr between the reflective pixel electrode 238r and the reflective common electrode 240r in the reflective area RA, an intensity of an electric field of the transmissive area TA generated between the transmissive pixel electrode 238t and the transmissive common electrode 240t may be greater than an intensity of an electric field of the reflective area RA generated between the reflective pixel electrode 238r and the reflective common electrode 240r even when the same data voltage is applied to the reflective pixel electrode 238r and the transmissive pixel electrode 238t. As a result, a liquid crystal molecule (not shown) in the liquid crystal capsule of the liquid crystal layer of the transmissive area TA is aligned along a direction of the electric field more uniformly than a liquid crystal molecule in the liquid crystal capsule of the liquid crystal layer of the reflective area RA, and an average retardation of the liquid crystal layer of the transmissive area TA may be greater than an average retardation of the liquid crystal layer of the reflective area RA.

For example, the liquid crystal layer of the transmissive area TA may have an average retardation of $\lambda/2$ and the liquid crystal layer of the reflective area RA may have an average retardation of $\lambda/4$ by the same data voltage. The average retardations of $\lambda/2$ and $\lambda/4$ may have a fabrication deviation of about ±20 nm.

Specifically, since the plurality of reflective pixel electrodes 238r and the plurality of transmissive electrodes 240r of the reflective area RA are disposed along a first direction in parallel with the plurality of data lines DL and the plurality of transmissive pixel electrodes 238t and the plurality of transmissive common electrodes 240t of the transmissive area TA are disposed along a second direction in parallel with the plurality of gate lines GL, each pixel P is formed to have a 2-domain structure where directions of images displayed by the reflective area RA and the transmissive area TA are different from each other. As a result, a viewing angle is improved.

In the transflective type LCD device 210 including the liquid crystal capsule according to the second embodiment of the present disclosure, since the transmissive separation distance dt between the transmissive pixel electrode 238t and the transmissive common electrode 240t in the transmissive area TA of the pixel P is smaller than the reflective separation distance dr between the reflective pixel electrode 238r and the reflective common electrode 240r in the reflective area RA of the pixel P, the liquid crystal layer of the transmissive area TA and the liquid crystal layer of the reflective area RA have the different average retardations from each other even by the single data voltage.

Since the liquid crystal layer of the transmissive area TA and the liquid crystal layer of the reflective area RA have the average retardations of $\lambda/4$ and $\lambda/2$, respectively, by the single data voltage, the transmissive area TA and the reflective area RA are driven by the single gate line and the single data voltage. Accordingly, the number of the gate lines and the number of the TFTs are reduced and the fabrication process is simplified. In addition, the transmittance increases, and increase of the driving frequency and decrease of the resolution are prevented.

Further, since the liquid crystal layer has the single cell gap using the plurality of liquid crystal capsules and the liquid crystal layers of the reflective area RA and the transmissive area TA have different retardations from each other due to the first and second horizontal electric fields, a black is displayed without a light leakage and the fabrication process is simplified. In addition, a contrast ratio is improved and a power consumption is reduced.

Moreover, since the reflective pixel electrode 238r and the transmissive electrode 240r of the reflective area RA are disposed along a first direction and the transmissive pixel electrode 238t and the transmissive common electrode 240t of the transmissive area TA are disposed along a second direction crossing the first direction, each pixel P is formed to have a 2-domain structure where directions of images displayed by the reflective area RA and the transmissive area TA are different from each other. As a result, a viewing angle is improved.

Figure 7:
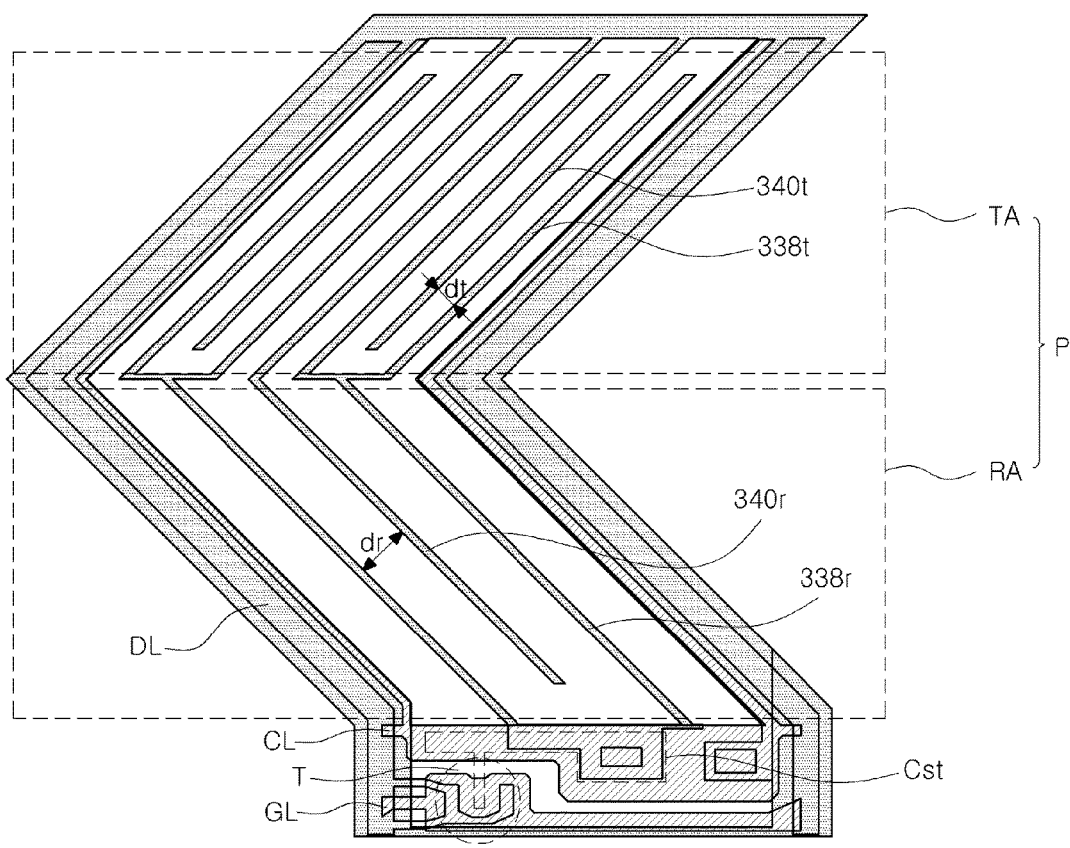
FIG. 7 is a plan view showing a transflective type liquid crystal display device including a liquid crystal capsule according to a third embodiment of the present disclosure.

FIG. 7 is a plan view showing a transflective type liquid crystal display device including a liquid crystal capsule according to a third embodiment of the present disclosure. Illustrations on parts of the third embodiment which are the same as parts of the first embodiment will be omitted.

In FIG. 7, a transflective type liquid crystal display (LCD) device 310 according to a third embodiment of the present disclosure includes a plurality of gate lines GL, a plurality of data lines DL and a plurality of common lines CL. The plurality of gate lines GL and the plurality of data lines DL cross each other to define a plurality of pixels P, and the plurality of common lines CL are spaced apart from and in parallel with the plurality of gate lines GL. Each of the plurality of pixels P includes a transmissive area TA and a reflective area RA.

A gate electrode of a thin film transistor (TFT) T is connected to the gate line GL, and a source electrode of the TFT T is connected to the data line DL.

A plurality of reflective pixel electrodes 338r connected to a drain electrode of the TFT T and a plurality of reflective common electrodes 340r spaced apart from and in parallel with the plurality of reflective pixel electrodes 338r are formed in the reflective area RA.

A plurality of transmissive pixel electrodes 338t connected to the plurality of reflective pixel electrodes 338r of the reflective area RA and a plurality of transmissive common electrodes 340t connected to the plurality of reflective common electrodes 340r of the reflective area RA and spaced apart from and in parallel with the plurality of transmissive pixel electrodes 338t are formed in the transmissive area TA.

Here, the plurality of reflective pixel electrodes 338r, the plurality of reflective common electrodes 340r, the plurality of transmissive pixel electrodes 338t and the plurality of transmissive common electrodes 340t may have a bar shape. The plurality of reflective pixel electrodes 338r and the plurality of reflective common electrodes 340r may be disposed along a first direction having a first acute angle (e.g., −45 degree) with respect to the plurality of gate lines GL, and the plurality of transmissive pixel electrodes 338t and the plurality of transmissive common electrodes 340t may be disposed along a second direction having a second acute angle (e.g., +45 degree) with respect to the plurality of gate lines GL.

In another embodiment, the plurality of reflective pixel electrodes 338r and the plurality of reflective common electrodes 340r may be disposed along the second direction having the second acute angle (e.g., +45 degree) with respect to the plurality of gate lines GL, and the plurality of transmissive pixel electrodes 338t and the plurality of transmissive common electrodes 340t may be disposed along the first direction having the first acute angle (e.g., −45 degree) with respect to the plurality of gate lines GL. Ones of the plurality of reflective pixel electrodes 338r and the plurality of reflective common electrodes 340r may have a plate shape and the others of the plurality of reflective pixel electrodes 338r and the plurality of reflective common electrodes 340r may have a bar shape. Alternatively, ones of the plurality of transmissive pixel electrodes 338t and the plurality of transmissive common electrodes 340t may have a plate shape and the others of the plurality of transmissive pixel electrodes 338t and the plurality of transmissive common electrodes 340t may have a bar shape.

A reflective separation distance dr between the reflective pixel electrode 338r and the reflective common electrode 340r in the reflective area RA may be greater than a transmissive separation distance dt between the transmissive pixel electrode 338t and the transmissive common electrode 340t in the transmissive area TA. (dr>dt)

For example, the reflective separation distance dr may be substantially twice of the transmissive separation distance dt (dr~2dt)(e.g., 1.8dt≤dr≤2.2dt).

A liquid crystal layer (not shown) having a single cell gap and including a liquid crystal capsule (not shown) is formed on the plurality of reflective pixel electrodes 338r, the plurality of reflective common electrodes 340r, the plurality of transmissive pixel electrodes 338t and the plurality of transmissive common electrodes 340t.

Here, when a high level voltage of a gate voltage transmitted through the gate line GL is applied to the TFT T, the TFT T is turned on, and a data voltage transmitted through the data line DL is applied to each of the reflective pixel electrode 338r and the transmissive pixel electrode 338t through the TFT T.

In the transflective type LCD device 310, a light of a backlight unit (not shown) passes through the liquid crystal layer of the transmissive area TA once and an ambient light passes through the liquid crystal layer of the reflective area RA twice. In addition, the reflective separation distance dr between the reflective pixel electrode 338r and the reflective common electrode 340r in the reflective area RA is greater than the transmissive separation distance dt between the transmissive pixel electrode 338t and the transmissive common electrode 340t in the transmissive area TA. As a result, a retardation of the liquid crystal layer of the transmissive area TA is greater than a retardation of the liquid crystal layer of the reflective area RA, and a uniform light efficiency is obtained in the reflective area RA and the transmissive area TA.

Since the transmissive separation distance dt between the transmissive pixel electrode 338t and the transmissive common electrode 340t in the transmissive area TA is smaller than the reflective separation distance dr between the reflective pixel electrode 338r and the reflective common electrode 340r in the reflective area RA, an intensity of an electric field of the transmissive area TA generated between the transmissive pixel electrode 338t and the transmissive common electrode 340t may be greater than an intensity of an electric field of the reflective area RA generated between the reflective pixel electrode 338r and the reflective common electrode 340r even when the same data voltage is applied to the reflective pixel electrode 338r and the transmissive pixel electrode 338t. As a result, a liquid crystal molecule (not shown) in the liquid crystal capsule of the liquid crystal layer of the transmissive area TA is aligned along a direction of the electric field more uniformly than a liquid crystal molecule in the liquid crystal capsule of the liquid crystal layer of the reflective area RA, and an average retardation of the liquid crystal layer of the transmissive area TA may be greater than an average retardation of the liquid crystal layer of the reflective area RA.

For example, the liquid crystal layer of the transmissive area TA may have an average retardation of $\lambda/2$ and the liquid crystal layer of the reflective area RA may have an average retardation of $\lambda/4$ by the same data voltage.

Specifically, since the plurality of reflective pixel electrodes 338r and the plurality of transmissive electrodes 340r of the reflective area RA are disposed along a first direction having a first acute angle (e.g., −45 degree) with respect to the plurality of gate lines GL and the plurality of transmissive pixel electrodes 338t and the plurality of transmissive common electrodes 340t of the transmissive area TA are disposed along a second direction having a second acute angle (e.g., +45 degree) with respect to the plurality of gate lines GL, each pixel P is formed to have a 2-domain structure where directions of images displayed by the reflective area RA and the transmissive area TA are different from each other. As a result, a viewing angle is improved.

In the transflective type LCD device 310 including the liquid crystal capsule according to the third embodiment of the present disclosure, since the transmissive separation distance dt between the transmissive pixel electrode 338t and the transmissive common electrode 340t in the transmissive area TA of the pixel P is smaller than the reflective separation distance dr between the reflective pixel electrode 338r and the reflective common electrode 340r in the reflective area RA of the pixel P, the liquid crystal layer of the transmissive area TA and the liquid crystal layer of the reflective area RA have the different average retardations from each other even by the single data voltage.

Since the liquid crystal layer of the transmissive area TA and the liquid crystal layer of the reflective area RA have the average retardations of $\lambda/4$ and $\lambda/2$, respectively, by the single data voltage, the transmissive area TA and the reflective area RA are driven by the single gate line and the single data voltage. Accordingly, the number of the gate lines and the number of the TFTs are reduced and the fabrication process is simplified. In addition, the transmittance increases, and increase of the driving frequency and decrease of the resolution are prevented.

Further, since the liquid crystal layer has the single cell gap using the plurality of liquid crystal capsules and the liquid crystal layers of the reflective area RA and the transmissive area TA have different retardations from each other due to the first and second horizontal electric fields, a black is displayed without a light leakage and the fabrication process is simplified. In addition, a contrast ratio is improved and a power consumption is reduced.

Moreover, since the reflective pixel electrode 338r and the transmissive electrode 340r of the reflective area RA are disposed along a first direction and the transmissive pixel electrode 338t and the transmissive common electrode 340t of the transmissive area TA are disposed along a second direction crossing the first direction, each pixel P is formed to have a 2-domain structure where directions of images displayed by the reflective area RA and the transmissive area TA are different from each other. As a result, a viewing angle is improved.

It will be apparent to those skilled in the art that various modifications and variations can be made in the transflective type liquid crystal display device including a liquid crystal capsule of the present disclosure without departing from the technical idea or scope of the disclosure. Thus, it is intended that the present disclosure cover the modifications and variations of this disclosure provided they come within the scope of the appended claims and their equivalents.

What is claimed is:

1. A liquid crystal display device, comprising:
a substrate including a pixel, the pixel including first and second areas;
a thin film transistor on the substrate in the pixel;
a plurality of first pixel electrodes in the first area, each first pixel electrode being connected to the thin film transistor;
a plurality of first common electrodes in the first area, each first common electrode being spaced apart from a corresponding first pixel electrode by a first separation distance, each first common electrode being in parallel with the first pixel electrodes;
a plurality of second pixel electrodes in the second area, each second pixel electrode being connected to a corresponding pair of first pixel electrodes;
a plurality of common electrodes in the second area, each second common electrode being spaced apart from a corresponding second pixel electrode by a second separation distance different from the first separation distance, a corresponding second common electrode being in parallel with the second pixel electrodes; and
a liquid crystal layer on the first pixel electrodes, the first common electrodes, the second pixel electrodes, and the second common electrodes,
wherein the first pixel electrodes have a same width as the second pixel electrodes, and
wherein the first common electrodes have a same width as the second common electrodes.

2. The liquid crystal display device of claim 1, wherein the first separation distance is greater than the second separation distance.

3. The liquid crystal display device of claim 1, wherein the first separation distance is twice the second separation distance.

4. The liquid crystal display device of claim 1, further comprising:

a first retardation film on the liquid crystal layer;
a first polarizing film on the first retardation film;
a second retardation film under the substrate; and
a second polarizing film under the second retardation film.

5. The liquid crystal display device of claim 4, wherein a transmission axis of the first polarizing film is a same direction as a transmission axis of the second polarizing film.

6. The liquid crystal display device of claim 1, wherein the liquid crystal layer of the first area has a same thickness as the liquid crystal layer of the second area.

7. The liquid crystal display device of claim 1, wherein:
the liquid crystal layer of the first area has an average retardation of 0 when a first voltage is applied between the first pixel electrodes and the first common electrodes;
the liquid crystal layer of the second area has an average retardation of 0 when the first voltage is applied between the second pixel electrodes and the second common electrodes; and
the first and second areas display a black.

8. The liquid crystal display device of claim 7, wherein:
the liquid crystal layer of the first area has an average retardation of $\lambda/4$ when a second voltage greater than the first voltage is applied between the first pixel electrodes and the first common electrodes;
the liquid crystal layer of the second area has an average retardation of $\lambda/2$ when the second voltage is applied between the second pixel electrodes and the second common electrodes; and
the first and second areas display a white.

9. The liquid crystal display device of claim 1, further comprising:
a gate line and a data line connected to the thin film transistor and crossing each other to define the pixel,
wherein the first pixel electrodes and the first common electrodes are disposed along a first direction in parallel with one of the gate line and the data line, and
wherein the second pixel electrodes and the second common electrodes are disposed along the first direction.

10. The liquid crystal display device of claim 1, further comprising:
a gate line and a data line connected to the thin film transistor and crossing each other to define the pixel,
wherein the first pixel electrodes and the first common electrodes are disposed along a first direction in parallel with one of the gate line and the data line, and
wherein the second pixel electrodes and the second common electrodes are disposed along a second direction crossing the first direction.

11. The liquid crystal display device of claim 1, further comprising:
a gate line and a data line connected to the thin film transistor and crossing each other to define the pixel,
wherein the first pixel electrodes and the first common electrodes are disposed along a first direction having a first acute angle with respect to one of the gate line and the data line, and
wherein the second pixel electrodes and the second common electrodes are disposed along a second direction crossing the first direction.

12. The liquid crystal display device of claim 1, wherein the liquid crystal layer includes a plurality of liquid crystal capsules.

13. The liquid crystal display device of claim 1, wherein data voltages applied to the first and second pixel electrodes are a same as each other.

14. The liquid crystal display device of claim 1, wherein:
at least a first of the second common electrodes is in only the second area and not in the first area; and
at least a second of the second common electrodes extends between the first area and the second area.

* * * * *